Figure 7:
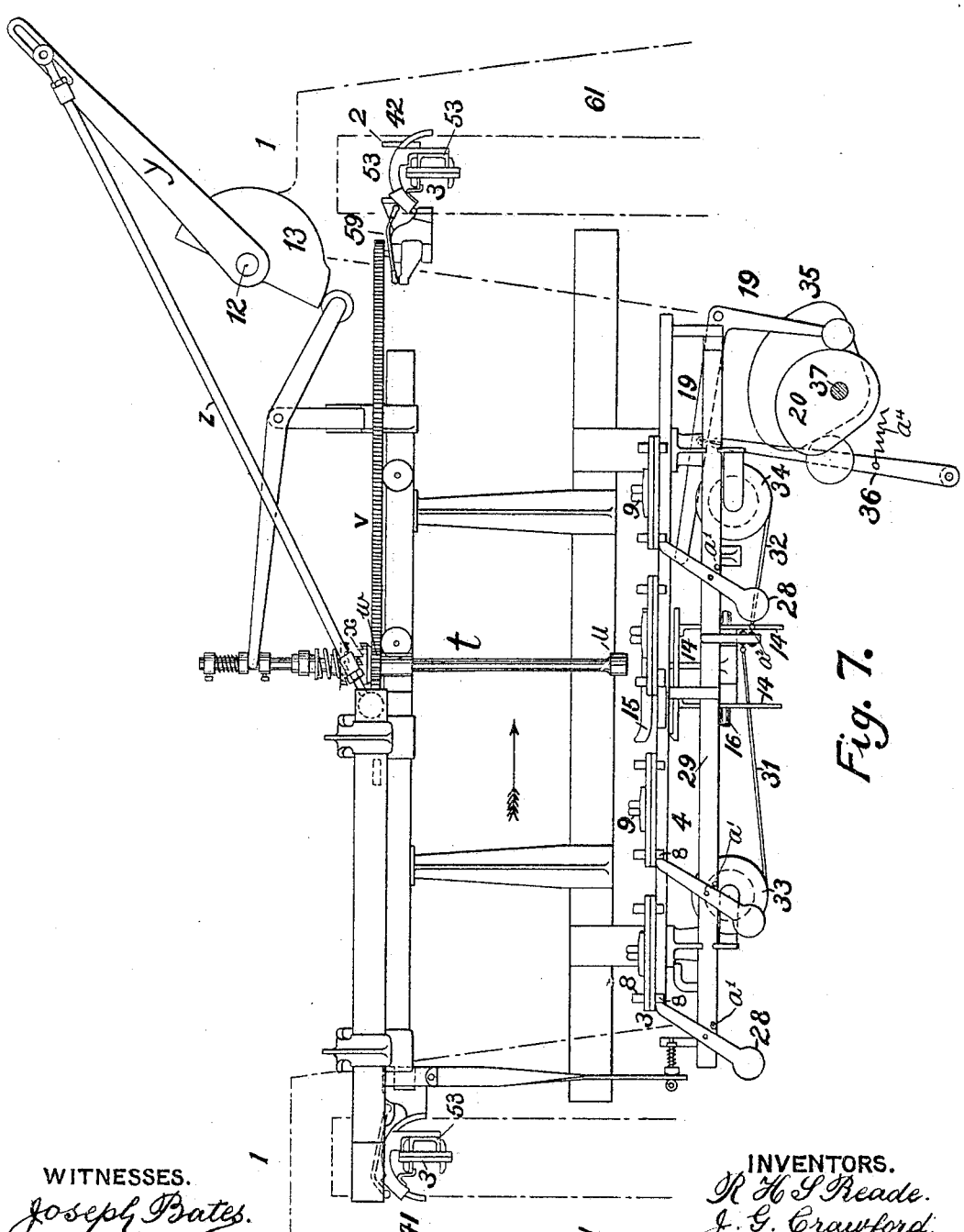

No. 775,352. PATENTED NOV. 22, 1904.
R. H. S. READE, J. G. CRAWFORD & A. McKIBBIN.
HACKLING MACHINE FOR FLAX OR OTHER LONG STAPLE FIBERS.
APPLICATION FILED AUG. 17, 1901.
NO MODEL. 11 SHEETS—SHEET 1.
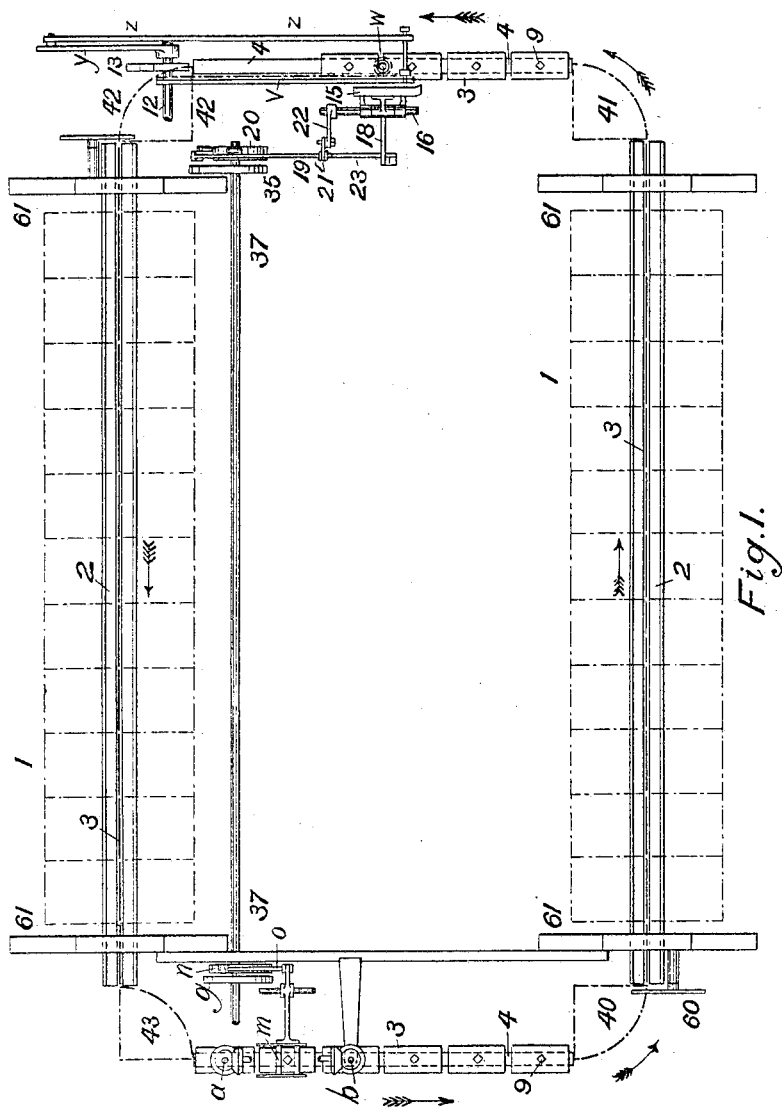
WITNESSES.
Joseph Bates.
E. Howard.
INVENTORS.
R. H. S. Reade.
J. G. Crawford.
A. McKibbin.

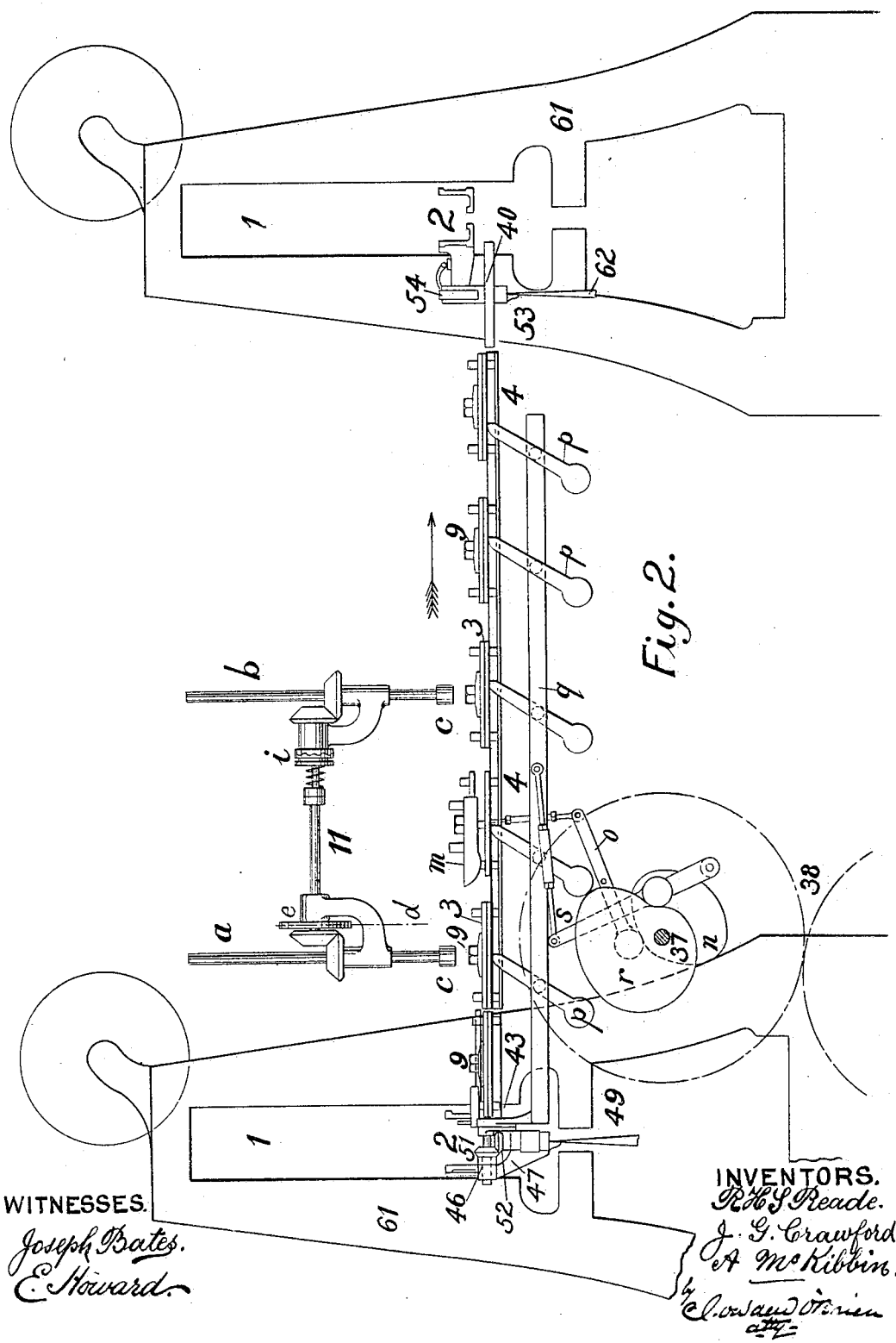

No. 775,352. PATENTED NOV. 15, 1904.
R. H. S. READE, J. G. CRAWFORD & A. McKIBBIN.
HACKLING MACHINE FOR FLAX OR OTHER LONG STAPLE FIBERS.
APPLICATION FILED AUG. 17, 1901.
NO MODEL. 11 SHEETS—SHEET 3.
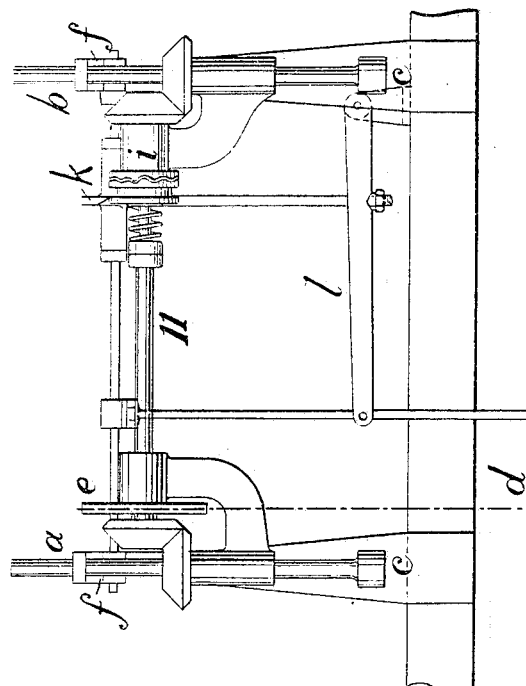
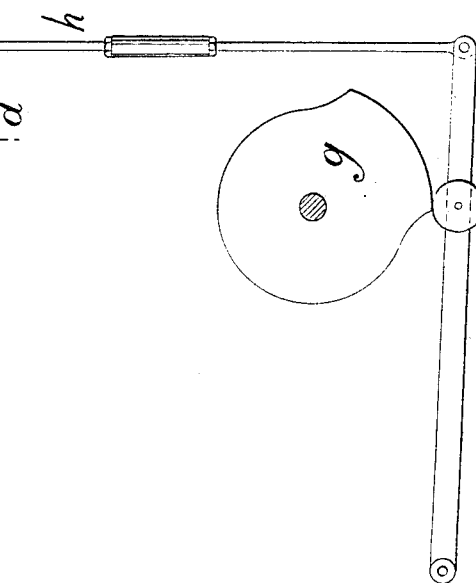
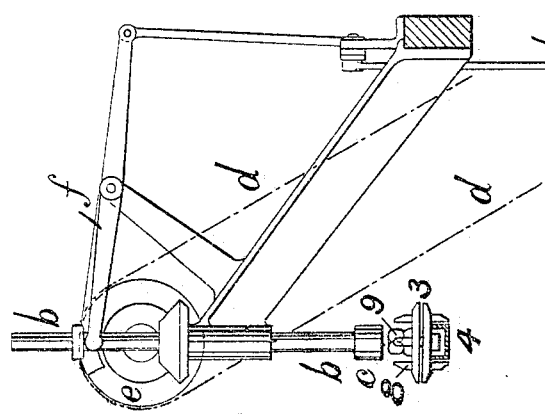
WITNESSES.
Joseph Bates.
E. Howard
INVENTORS.
R. H. S. Reade.
J. G. Crawford.
A. McKibbin.
by Howard O'Brien
atty.

No. 775,352. PATENTED NOV. 22, 1904.
R. H. S. READE, J. G. CRAWFORD & A. McKIBBIN.
HACKLING MACHINE FOR FLAX OR OTHER LONG STAPLE FIBERS.
APPLICATION FILED AUG. 17, 1901.
NO MODEL. 11 SHEETS—SHEET 4.
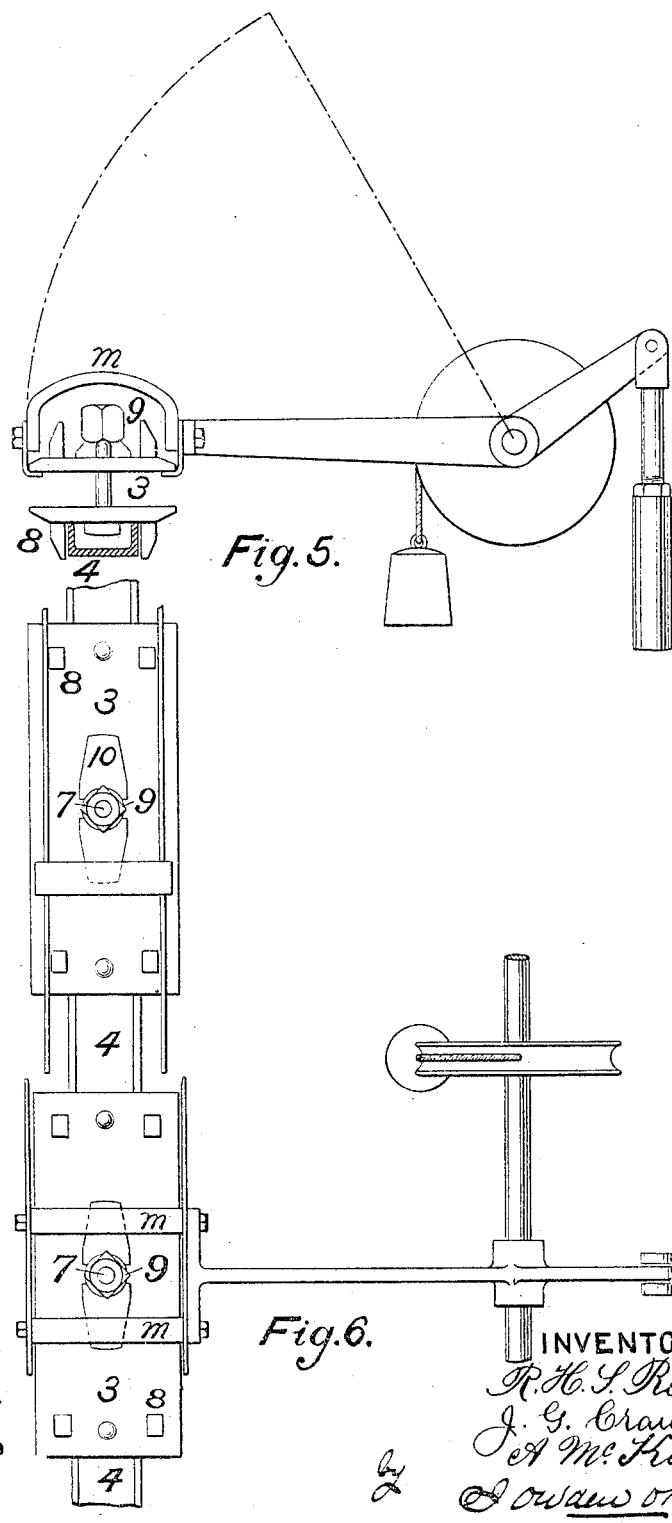

No. 775,352. PATENTED NOV. 22, 1904.
R. H. S. READE, J. G. CRAWFORD & A. McKIBBIN.
HACKLING MACHINE FOR FLAX OR OTHER LONG STAPLE FIBERS.
APPLICATION FILED AUG. 17, 1901.
NO MODEL. 11 SHEETS—SHEET 6.
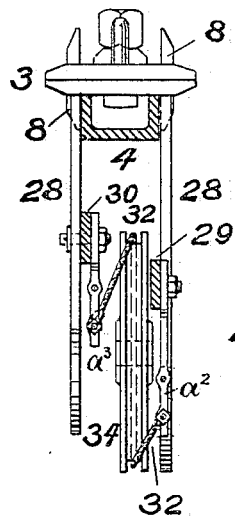
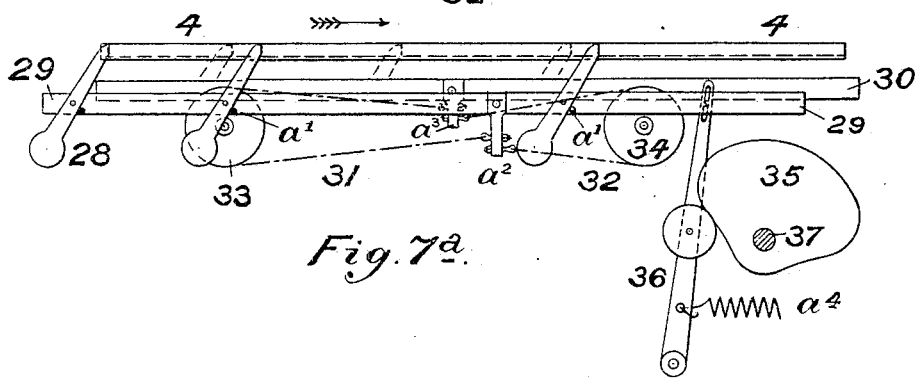
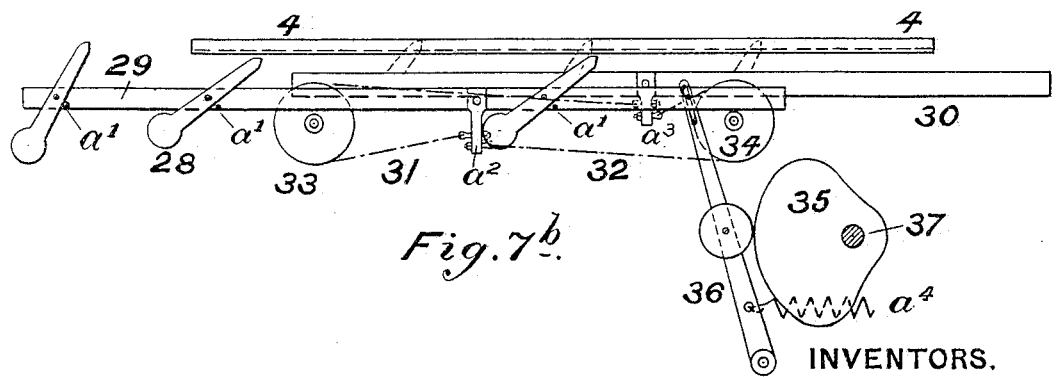
WITNESSES.
Joseph Bates.
E. Howard.
INVENTORS.
R H S Reade
J G Crawford
A McKibbin

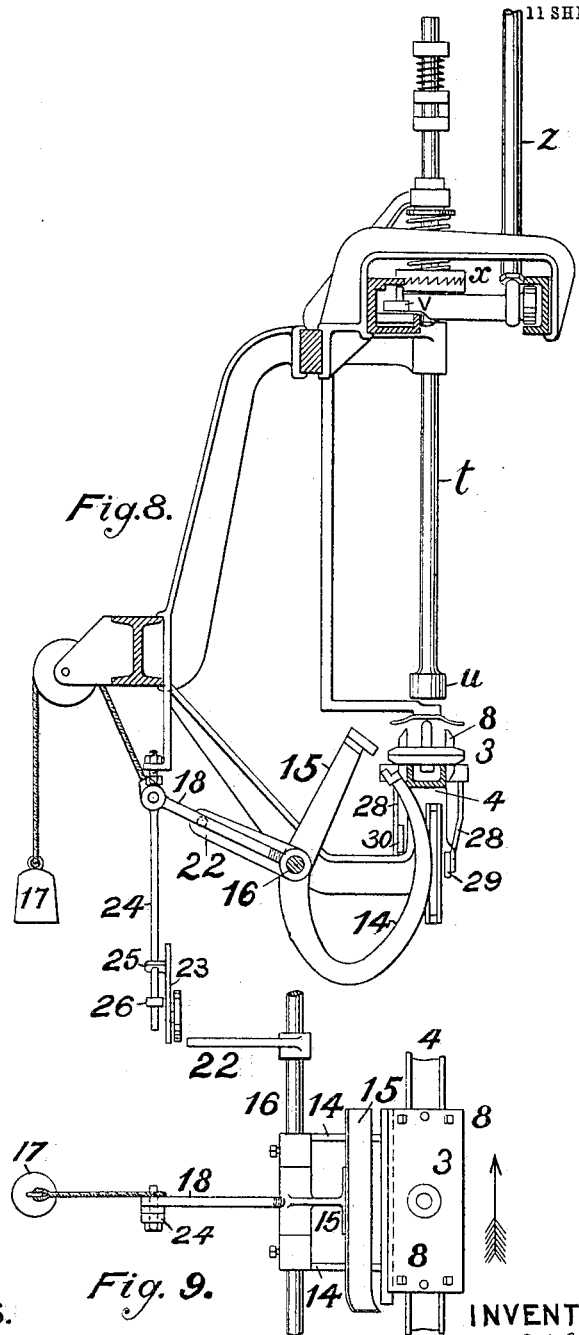

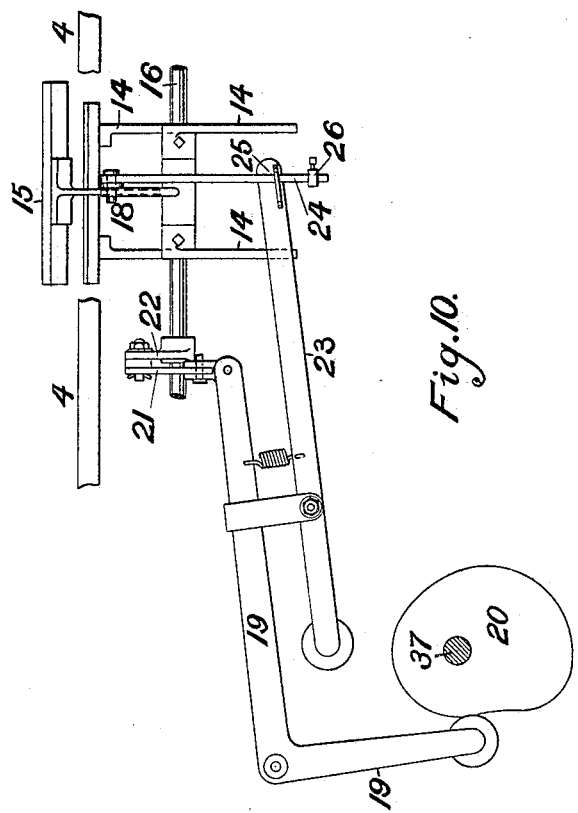

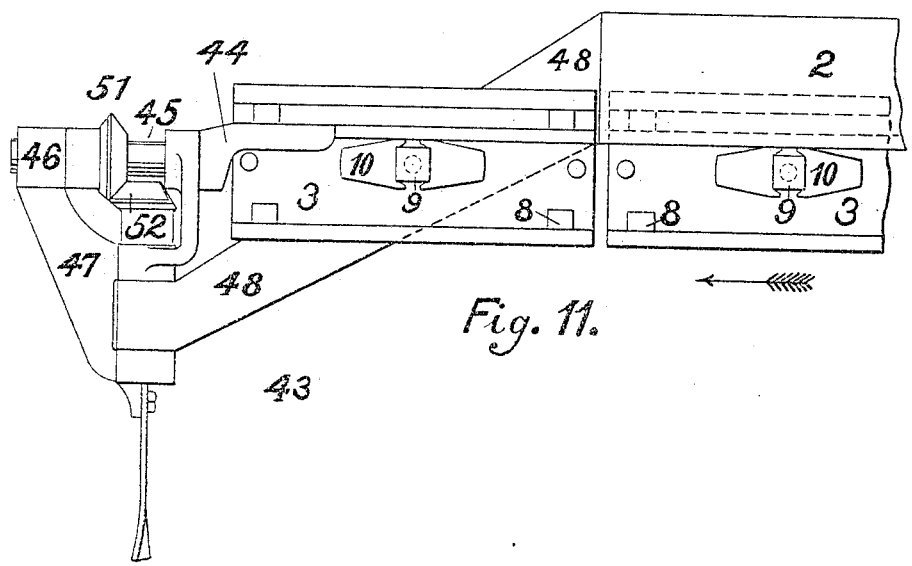
Fig. 11.
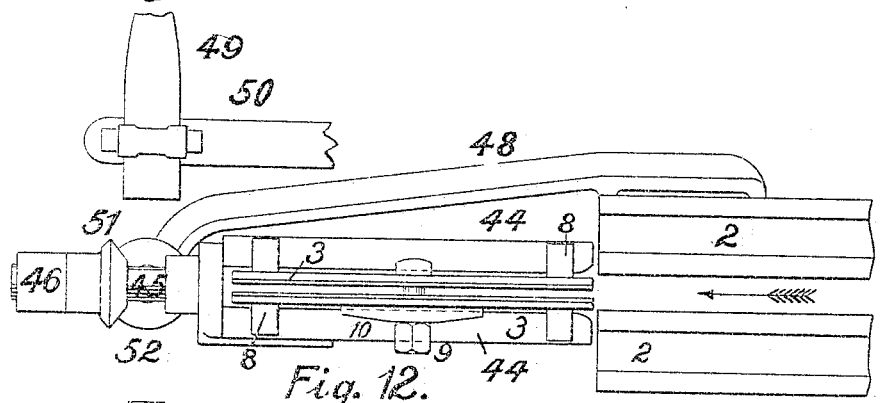
Fig. 12.
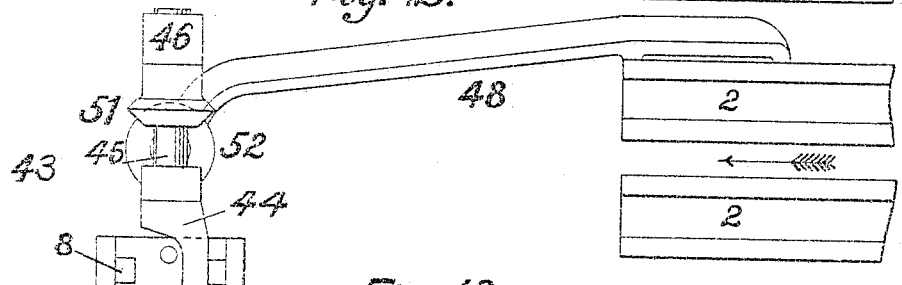
Fig. 13.
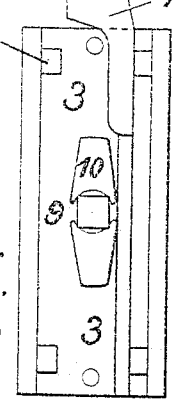

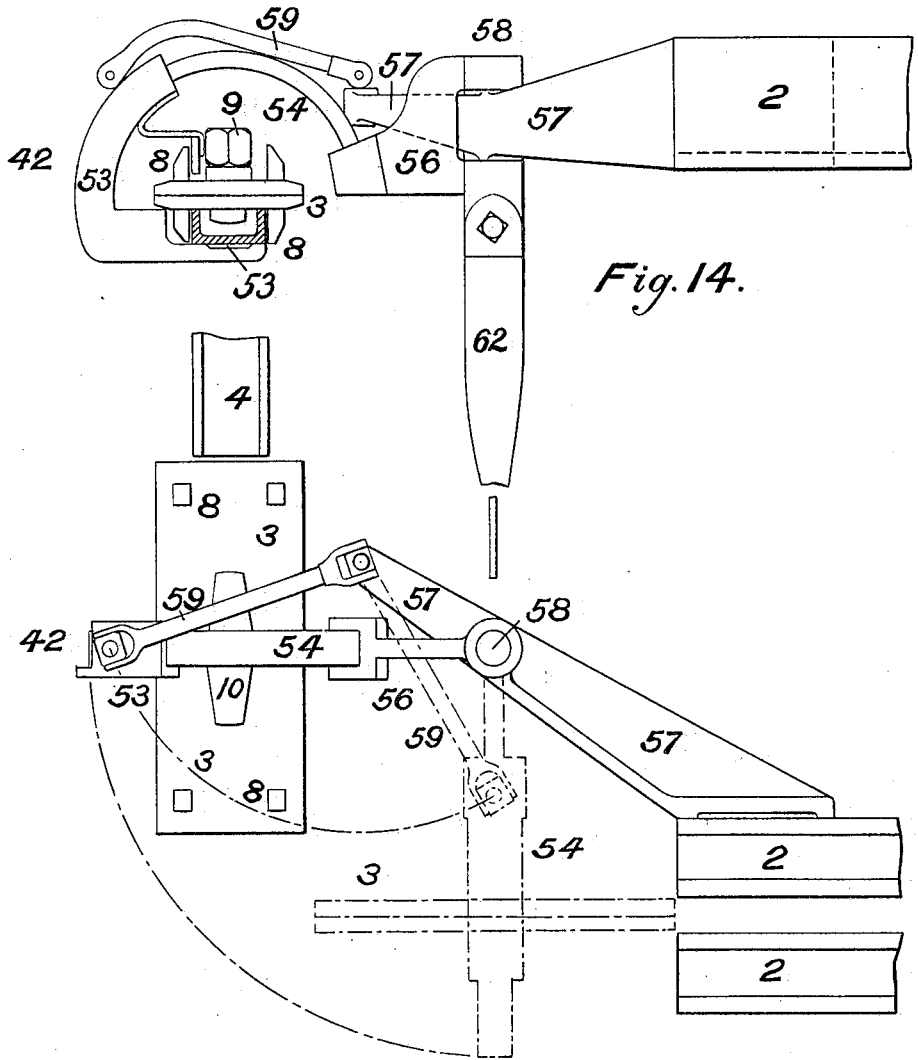

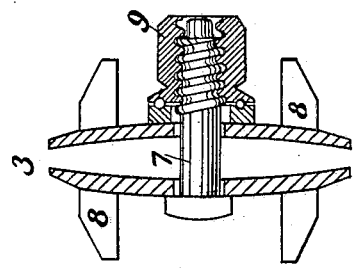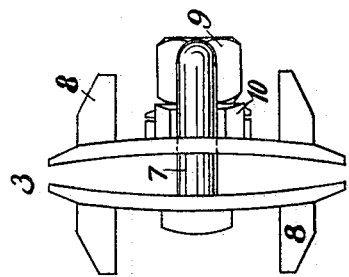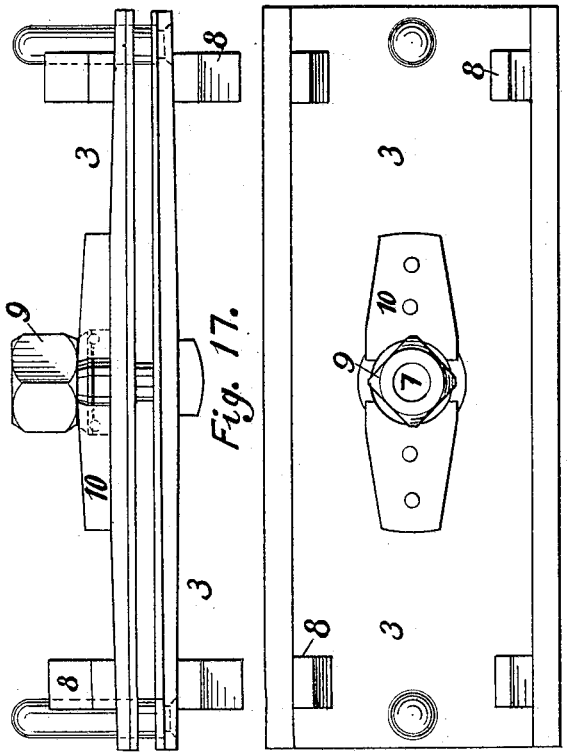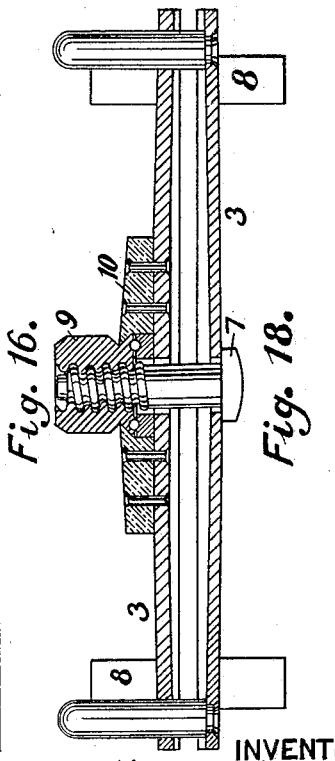

Patented November 22, 1904.

UNITED STATES PATENT OFFICE.

ROBERT H. S. READE, JAMES G. CRAWFORD, AND ALEXANDER McKIBBIN, OF BELFAST, IRELAND.

HACKLING-MACHINE FOR FLAX OR OTHER LONG-STAPLE FIBERS.

SPECIFICATION forming part of Letters Patent No. 775,352, dated November 22, 1904.

Application filed August 17, 1901. Serial No. 72,444. (No model.)

*To all whom it may concern:*

Be it known that we, ROBERT HENRY STURROCK READE, JAMES GLASGOW CRAWFORD, and ALEXANDER McKIBBIN, British subjects, and residents of Belfast, in the county of Antrim, Ireland, have invented certain new and useful Improvements in Hackling-Machines for Flax or other Long-Staple Fibers, of which the following is a specification.

This invention relates to improvements in hackling-machines of the type in which the stricks or pieces of flax are carried continuously round through two machines and hackled at both ends, such as described in the specification of Eves' Patent No. 662,117, dated November 20, 1900, and is designed to provide mechanism for turning over the holders and drawing the flax through the holders when the flax projecting at one side has been hackled and also in mechanism for screwing up and unscrewing the holders. In order to accomplish the continuous movement of the flax and flax-holders through the two machines without interference or attention by an attendant, it has hitherto been considered necessary to dispense with the ordinary form of holder clamped by a screw, and in the above-mentioned patent the bodies of the machines have been altered or modified to provide mechanism for applying the necessary pressure to the holders to retain the flax under operation, and this pressure has also been released at each lift of the channels to permit of the holders being moved forward.

This invention obviates the necessity of altering the body of the machine in any way and permits of the use of the screw-holders, the additional mechanism for manipulating the holders being external to the main channels, which remain of the usual form.

The invention will be fully described with reference to the accompanying drawings, in which sufficient of a hackling-machine is shown to illustrate the invention.

Figure 1 is a diagrammatic plan of the machines; Fig. 2, an elevation of the feed end of the machine; Fig. 3, an elevation, enlarged, of the screwing and unscrewing mechanism at feed end of the machine; Fig. 4, an elevation of same at right angles to Figs. 2 and 3; Fig. 5, an elevation of lifter for removing cover of holder 3 at feed end of the machine; Fig. 6, a plan of Fig. 5; Fig. 7, an elevation of the changing end of the machine; Fig. 7$^a$, an elevation of the catch-bars 29 and 30 for moving the holders 3 along the cross-channel 4; Fig. 7$^b$, an elevation of same, showing reversed position; Fig. 8, an elevation of changing mechanism at right angles to Fig. 7; Fig. 8$^a$, an elevation of catch-bars at right angles to Figs. 7$^a$ and 7$^b$, enlarged detail; Fig. 9, a plan of Fig. 8; Fig. 10, an elevation of levers for operating the changing mechanism, being the reverse side of Fig. 7; Fig. 11, an elevation of swiveling corner-piece 43 for transferring the holders from the main channel 2 of the second machine to the transverse end channel 4; Fig. 12, a plan of Fig. 11; Fig. 13, a plan of Fig. 11, showing the position of holder 3 before shifting into the transverse end channel; Fig. 14, an elevation of swiveling corner-pieces 40, 41, and 42 for transferring the holders from the transverse channel 4 to the main channel 2 of the machine, or vice versa; Fig. 15, a plan of Fig. 14; Fig. 16, a side elevation of the holder; Fig. 17, an edge view of same; Fig. 18, a longitudinal section of Fig. 16; Fig. 19, an end elevation of same; Fig. 20, a transverse section of Fig. 16.

The machines 1 are constructed as an ordinary pair of machines with the longitudinal main channels 2, along which the holders 3 are moved. At each end of the machines are placed the transverse channels 4, to and from which the holders 3 are carried by the swiveling corner-pieces 40, 41, 42, and 43. The main channels 2 rise and fall at each lift of the machine, and the transverse channels are fixed and stationary. The holders 3 are transferred at the top of each lift either from the main channel 2 to the transverse channel 4 or back from the transverse channel 4 to the main channel 2, the transverse channels serving to conduct or carry the holders 3 from one machine of the pair to the other. A constant succession of holders are thus moving along through the machines from one to the other, the flax being fed in and removed at the feed end of the machines, Fig. 2, and drawn through one side of the holder to the other at the changing end of the machines, Fig. 8.

The holders 3 are constructed, as shown in Figs. 16 to 20, with the screw 7 in the center and supporting or sliding pins 8 at each corner, so that the holder is in every way reversible and will work or travel through the machine with either edge uppermost. The screw 7 is fastened to the under plate of the holder and passes through the top plate, the nut 9 fitting onto the end of the screw and compressing the two plates of the holder together. The nut 9 is mounted on balls and is secured to the top plate of the holder by plates 10, the edges of which fit into a groove in the sides of the nut. The nut is thus always held in position on the top plate or cover, so that it and the plate may together be lifted and removed and together returned to position over the other plates.

At the feed end of the machine, (see Figs. 2, 3, 4,) at which the flax is first inserted in the holders and the finished or hackled flax is subsequently removed from the holders, there are mounted over the transverse channel 4 two rotating spindles $a$ and $b$, rotating in opposite directions and fitted at their lower ends with box-wrenches $c$ to engage the nuts 9 of the holders 3. The spindles $a$ and $b$ are rotated by bevel-wheels on the cross-spindle 11, the spindle $a$ unscrewing the nuts and the spindle $b$ screwing or tightening them up again. The spindles are driven by a driving-chain $d$ on the driving-wheel $e$ from any rotating shaft. The spindles $a$ and $b$ are lowered to engage the nuts 9 and are raised again by levers $f$, actuated by the cam $g$, operating through a connecting-rod $h$. The screwing-up spindle $b$ is driven through a spring-clutch $i$, the faces of which slip past one another when the nut 9 is screwed up to its full extent, leaving the cross-spindle 11 free to continue to revolve. When the driving half of the clutch is thrown back by revolving past the teeth of the other part, it is held back by a pawl $k$ and the catch is lifted and the clutch thrown into gear again by the lever $l$, connected at one end to the connecting-rod $h$. As the holder 3 passes from the unscrewing-spindle $a$ to a position midway between the spindles $a$ and $b$ a lifter $m$ engages the top plate. The lifter $m$ is raised and lowered by the cam $n$, operating through the lever $o$. The lifter $m$ raises the top plate or cover away from the holder 3, (to the position shown by the dotted lines, Fig. 5,) leaving the bottom plate free for the removal of the finished or hackled piece or bunch of flax and the replacing thereof by a fresh piece or bunch of flax.

The holders 3 are moved along the transverse channel 4 at the feed end of the machine, Fig. 2, by the catches $p$, pivoted to the sliding bar $q$, operated by the cam $r$ and lever $s$.

At the changing end of the machine, Figs. 7, 8, 9, and 10, above the transverse channel 4 is mounted a screwing and unscrewing spindle $t$, with a box-wrench $u$ at its lower end to engage the nuts 9 of the holders 3. The spindle $t$ is rotated first in one direction and then in the reverse direction by a long sliding rack $v$, engaging with the rack-wheel $w$, connected to the spindle by the spring-clutch $x$. The rack $v$ is moved to and fro by the crank-arm $y$ and the connecting-rod $z$. The crank-arm $y$ is secured to the lifting-shaft 12 of the machine. The screwing-spindle $t$ is lowered onto the nuts 9 by the cam 13 on the shaft 12 and is lifted again clear of the nuts by the same cam.

The position of the holders 3 (shown in Fig. 7) is after the main channels have been lifted to the top of the lift and the movement of the holders in the cross-channel 4 has commenced after the screwing-spindle $t$ has been lifted clear of the nuts 9 to allow the holders 3 to pass. The holders are moved along by the pivoted pawls 28, pivoted to the bars 29 and 30.

While the holders 3 are at rest, as soon as the nut 9 is slackened and the cover of the holder is released from pressure the flax is pulled through from one side of the holder to the other before the screw is tightened or screwed up again in order to present the ends of the flax which have not been hackled to the next machine. For this purpose a gripper comprised of two pivoted arms or levers 14 and 15, Figs. 8 and 10, close upon the projecting ends of the piece of flax and draw it through the holder. The two arms 14 and 15 are pivoted upon the shaft 16, the arm 14 being affixed to the shaft to rotate with it and the arm 15 being loose on the shaft and held in position by a weight 17, with a cord attached to the other end of the arm 18. The arm 14 moves toward the arm 15 by the cam 20, acting through the lever 19, connecting-link 21, and crank-lever 22, affixed to the shaft 16. As the arm 14 moves toward the arm 15 the flax is gripped between them and they are moved back together against the pressure of the weight 17. When the flax has been drawn a sufficient distance through the holder, the cam 20 ceases to act upon the lever 19 and the arm 14 returns by its own weight or the action of a spring to the position shown in Fig. 8. At the same time the cam 20 engages the end of the lever 23 and by means of a rod 24, passing through an eye 25 at the other end of the lever 23, with a stop 26 on the end, prevents the immediate return of arm 15, thereby releasing the grip upon the flax. The arm 15 subsequently returns to its original position as the cam 20 rotates and releases the end of the lever 23.

The holders 3 are moved along the transverse channel 4 at the changing end of the machine (see Figs. 7, 7$^a$, 7$^b$, and 8$^a$) by the weighted swinging pawls or catches 28, pivoted upon two reciprocating catch-bars 29 and 30. The normal position of the pawls 28 is approximately upright, as shown, and their upper ends engage the projections 8 on the under side of the holders 3 when moved in the direction of the arrow, Fig. $7^a$. When the pawls 38 are being moved backward in the reverse direction, (see Fig. $7^b$,) the pawls swivel on their pivots and pass under the projections 8. Each pawl is pivoted upon the bar and is provided with a stop-pin $a'$ to permit it to rotate only in one direction upon its axis. The catch-bars 29 and 30 are mounted to slide backward and forward and are connected by two cords or bars 31 and 32 to cause them to move synchronously, but in the reverse directions. The cords respectively pass round the pulleys 33 and 34. One end of the cord 31 is affixed to the bar 29 or to the bracket $a^2$, projecting therefrom, passes round the pulley 33, and the other end is affixed to the bar 30 or to the bracket $a^3$, projecting therefrom. Similarly the cord 32 is affixed to the bar 29 or to the bracket $a^2$, projecting therefrom, passes round the pulley 34, and the other end is affixed to the bar 30 or to the bracket $a^3$, projecting therefrom. By this arrangement of connecting the two bars 29 and 30 together a longitudinal movement imparted to either of them will be transmitted to the other. The bar 29 is reciprocated by the lever 36, a slot in the upper end of which engages with a pin on the bar. The lever 36 is engaged by the cam 35 on the shaft 37, which forces it in one direction, and it is drawn back in the reverse direction by a spring $a^4$, Figs. $7^a$ and $7^b$.

The cams $n$ $q$, 20, and 35 for actuating the several parts of the mechanism at the ends of the machine are mounted upon a cam-shaft 37. The shaft 37 is rotated by two toothed gearing-wheels 38, one on the shaft itself and the other on any suitable driving-shaft. These wheels are indicated on the drawings, Fig. 2, by dotted or broken lines representing the pitch circle of the wheels.

The transverse channels 4 at both ends of the machines 1 are fixed at the lowest level that the main channels 2 of the machines reach at the bottom of the lift, and at each end of the machines 1 there are fitted to the main channels and rising and falling with them swiveling corner-pieces 40, 41, 42, and 43, by two of which, 40 and 42, the holders are transferred from the transverse channels 4 to the main channels 2, and by the other two, 41 and 43, the holders 3 are transferred from the main channels 2 to the transverse channels 4. The holders are moved from the transverse channels 4 into the swiveling corner-pieces 40 and 42 at the lower level when the main channels 2 are at the bottom of the lift, and as the main channels rise the corner-pieces 40 and 42 are turned or swiveled through a quarter of a revolution and the holders are moved onward from them into the main channels at the higher level when the main channels 2 have nearly reached the top of the lift. The holders 3 are moved from the main channels 2 into the swiveling corner-pieces 41 and 43 at the higher level at the same time as the holders are being moved from the corner-pieces 40 and 42, this movement being performed by the same mechanism as shifts the holders in the main channels 2 of the machine. As the main channels 2 fall the corner-pieces 41 and 43 are turned or swiveled through a quarter of a revolution and the holders 3 are moved onward out of them into the transverse channels 4 at the lower level when the main channels 2 have reached the bottom of the lift. The swiveling corner-pieces 40 and 42 during the fall of the main channels 2 are rotated back empty to receive the next holder, and similarly the swiveling corner-pieces 41 and 43 are rotated back empty during the rise of the main channels 2 to receive the next holder as it is moved forward.

As will be seen from the drawings, the position of the holders 3 in the main channels 2 is vertical and in the transverse channels 4 their position is horizontal. It is therefore necessary to give the holders 3 a rotation about the vertical axis to bring them from the transverse channel 4 to the main channel 2, or vice versa, and it is also necessary to give them a rotation about their horizontal axis to bring them from the horizontal position on the transverse channels 4 to the vertical position in the main channels 2, or vice versa. This rotation is also effected by the swiveling corner-pieces.

The swiveling corner-piece 43, by which the holders 3 are transferred from the main channel 2 at the feed end of the machine to the cross-channel 4, is shown in detail in Figs. 11, 12, and 13. A channel-shaped bracket 44 to receive the holder is supported at one end by a horizontal pin or trunnion 45 free to revolve in bearings 46 upon a pivoted or swiveling bracket 47. The bracket 47 swivels upon a fixed vertical pivot carried by the arm or bracket 48, attached to and rising and falling with the main channel 2. A screw or twisted blade 49 is attached to the bracket and passes through a fixed slide 50. As therefore the main channel 2 rises and falls the bracket 47 and the channel-shaped bracket 44 are caused to rotate on their vertical axis. On the pin or trunnion 45 of the channel-bracket 44 is fixed a bevel-wheel 51, and on the stationary pivot upon which the swiveling bracket 47 rotates is fixed a bevel-wheel 52. The movement of the bracket 47 around its pivot causes the bevel-wheel 51 to rotate as it moves upon the fixed bevel-wheel 52, thereby causing the channel-bracket 44 to rotate horizontally from the position in Fig. 12 to that shown in Fig. 13.

The swiveling corner-piece 42 is shown in detail in Figs. 14 and 15, by which the holders are transferred from the transverse channel 4 at the changing end of the machine to the main channel 2. A channel-bracket 53 to receive the holder is supported upon a curved bar 54, attached to a swiveling bracket 56, pivoted to the arm 57, attached to and rising and falling with the main channel 2. The swiveling bracket 56 is rotated around the pivot 58 by a screw or twisted blade 62, similar to the screw-blade 49. The channel-bracket 53 is connected by a link 59 with the end of the rising-and-falling arm 57, upon which the swiveling bracket 56 is pivoted. As the bracket 56 rotates upon the vertical pivot or axis 58 the channel bracket 53 is drawn up over the curved bar 54, giving it and the holder 3 therein a rotation around its horizontal axis.

The swiveling corner-pieces 40 and 41 may be similarly constructed to the corner-piece 42 to give the desired movement to the holders, except that the bracket 53 is reversed and the link 59 also, so as to turn the bracket 53 about its horizontal axis in the contrary direction from that in corner-piece 42. The swiveling corner-pieces 40 and 41 may also be constructed similarly to the corner-piece 43, except that channel-bracket 44 in corner-piece 40 would be reversed.

The end frames 61 of the machines are of the ordinary shape and construction. The two machines are connected so as to be driven by a single belt.

What we claim as our invention, and desire to protect by Letters Patent, is—

1. In a machine for hackling flax and other long-staple fibers the combination with the hackling-machines 1 having feed and changing ends, the longitudinal channels 2 therein which carry the holders through the machines as the flax is being hackled, the screw-clamped flax-holders 3, the transverse channels 4 which carry the holders from one machine to the other, and the swiveling corner-pieces which transfer the holders from one set of channels to the other, of mechanism placed at the feed end of the machines, which screws and unscrews the nuts of the holders, and mechanism which removes the top plate of the holder to permit of the bunch of fiber being removed and replaced, and at the changing end of the machine, mechanism which unscrews and again screws up the nuts of the holders, and mechanism which draws the flax through each holder while the nut is slack, substantially as described.

2. In a machine for hackling flax and other long-staple fibers the combination with the hackling-machines 1 having feed and changing ends, the longitudinal channels 2 therein which carry the holders through the machine as the flax is being hackled, the screw-clamped flax-holders 3, the transverse channels 4 which carry the holders from one machine to the other, and the swiveling corner-pieces to transfer the holders from one set of channels to the other, of two upright spindles $a$ and $b$ rotated in opposite directions provided with box ends $c$ to engage the nuts 9 of the holders 3 and a lifter $m$ to engage with and raise the top plate from the holder to permit of removal and replacement of bunch of fiber substantially as described.

3. In a machine for hackling flax and other long-stapled fibers the combination with the hackling-machines 1 having feed and changing ends, the longitudinal channels 2 therein which carry the holders through the machine as the flax is being hackled, the screw-clamped flax-holders 3, the transverse channels 4 which carry the holders from one machine to the other, and the swiveling corner-pieces to transfer the holders from one set of channels to the other, of two upright spindles $a$ and $b$ rotated in opposite direction provided with box ends $c$ to engage the nuts 9 of the holders 3 and a lifter $m$ to engage with and raise the top plate from the holder to permit of removal and replacement of bunch of fiber, and the reciprocating bar $q$ and pawls $p$ to move the holders along the transverse channels 4 at the feed end substantially as described.

4. In a machine for hackling flax and other long-staple fibers the combination with the hackling-machines 1 having feed and changing ends, the longitudinal channels 2 therein which carry the holders through the machine as the flax is being hackled, the screw-clamped flax-holders 3, the transverse channels 4 which carry the holders from one machine to the other, and the swiveling corner-pieces to transfer the holders from one set of channels to the other of mechanism for turning the corner-pieces part of a revolution in a horizontal plane, and mechanism for turning them from the vertical to the horizontal and back again to the vertical substantially as described.

5. In a machine for hackling flax and other long-staple fibers the combination with the hackling-machines 1 having feed and changing ends, the longitudinal channels 2 therein which carry the holders through the machine as the flax is being hackled, the screw-clamped flax-holders 3, the transverse channels 4 which carry the holders from one machine to the other, and the swiveling corner-pieces to transfer the holders from one set of channels to the other, of the shaft 11, wheel $e$ and chain $d$ to rotate the spindles $a$ and $b$, and the cam $g$, connecting-rod $h$, and lever $f$, to raise and lower the spindles as required, substantially as described.

6. In a machine for hackling flax and other long-staple fibers the combination with the hackling-machines 1 having feed and changing ends, the longitudinal channels 2 therein which carry the holders through the machine as the flax is being hackled, the screw-clamped flax-holders 3, the transverse channels 4 which carry the holders from one machine to the other, and the swiveling corner-pieces to transfer the holders from one set of channels to the other, of the mechanism at the feed end of the machine to screw up and unscrew the nuts of the holders and the mechanism to remove and replace the cover of the holder, of a spindle *t* placed at the changing end of the machine to unscrew and screw up again the holder-nuts 9, substantially as described.

7. In a machine for hackling flax and other long-staple fibers the combination with the hackling-machines 1 having feed and changing ends, the longitudinal channels 2 therein which carry the holders through the machine as the flax is being hackled, the screw-clamped flax-holders 3, the transverse channels 4 which carry the holders from one machine to the other, and the swiveling corner-pieces to transfer the holders from one set of channels to the other, the mechanism at the feed end of the machine to screw up and unscrew the nuts of the holders and the mechanism to remove and replace the cover of the holder, of the spindle *t* placed at the changing end of the machine caused to rotate first in one direction and then in the other to unscrew and screw up again the holder-nuts, the pinion and clutch *r* on the spindle *t*, the rack *r* gearing with the pinion to give the rotary movement to the spindle and the connecting-rod *z* and the lever-arm *y* connected to the rack *r* to move it to and fro substantially as described.

8. In a machine for hackling flax and other long-staple fibers the combination with the hackling-machines 1 having feed and changing ends, the longitudinal channels 2 therein which carry the holders through the machine as the flax is being hackled, the screw-clamped flax-holders 3, the transverse channels 4 which carry the holders from one machine to the other, and the swiveling corner-pieces to transfer the holders from one set of channels to the other, the mechanism at the feed end of the machine to screw up and unscrew the nuts of the holders and the mechanism to remove and replace the cover of the holder, of the mechanism placed at the changing end of the machine to unscrew and screw up again the nuts on the holders, and mechanism to draw the fibers through the holders when the nuts are slack, substantially as described.

9. In a machine for hackling flax and other long-staple fibers the combination with the hackling-machines 1 having feed and changing ends, the longitudinal channels 2, therein which carry the holders through the machine as the flax is being hackled, the screw-clamped flax-holders 3, the transverse channels 4 which carry the holders from one machine to the other, and the swiveling corner-pieces to transfer the holders from one set of channels to the other, the mechanism at the feed end of the machine to screw up and unscrew the nuts of the holders and the mechanism to remove and replace the cover of the holder, of the mechanism placed at the changing end of the machine to unscrew and screw up again the nuts on the holders, and the gripper comprised of the two pivoted levers 14 and 15 which seize the flax and draw it through the holders, substantially as described.

10. In a machine for hackling flax and other long-staple fibers the combination with the hackling-machines 1 having feed and changing ends, the longitudinal channels 2 therein which carry the holders through the machine as the flax is being hackled, the screw-clamped flax-holders 3, the transverse channels 4 which carry the holders from one machine to the other, and the swiveling corner-pieces to transfer the holders from one set of channels to the other, the mechanism at the feed end of the machine to screw up and unscrew the nuts of the holders and the mechanism to remove and replace the cover of the holder, of the mechanism placed at the changing end of the machine to unscrew and screw up again the nuts on the holders, the two gripper-arms 14 and 15 which grip and draw back the fibers, the shaft 16 upon which they are pivoted, the counterbalance-weight 17, the lever 18 connected to the gripper-arm 15, the actuating-lever 19, cam 20 engaging therewith, the connecting-links 21 and 22, and the second lever 23, the rod 24 and eye 25 which retard the return of the lever 15 substantially as described and shown.

11. In a machine for hackling flax and other long-staple fibers the combination with the machines 1, the longitudinal channels 2 therein which carry the holders through the machine as the flax is being hackled, the screw-clamped flax-holders 3, the transverse channels 4 which carry the holders from one machine to the other, the bracket 53 to receive the holder 3, the bar 54 upon which it is supported, the bracket 56 pivoted upon the pin 58, the bracket 57 supporting the pin 58, the link 59 connected to the bracket 53 and to the bracket 57, and the screwed blade 62 affixed to the bracket 56, substantially as described.

In witness whereof we have hereunto signed our names in the presence of two subscribing witnesses.

R. H. S. READE.
  J. G. CRAWFORD.
  ALEXANDER McKIBBIN.

Witnesses:
  D. LOUDON,
  JNO. J. ROBINSON.